C. N. PULSE.
RIDING ATTACHMENT FOR CULTIVATORS.
APPLICATION FILED OCT. 2, 1917.
1,279,435.
Patented Sept. 17, 1918.
2 SHEETS—SHEET 1.
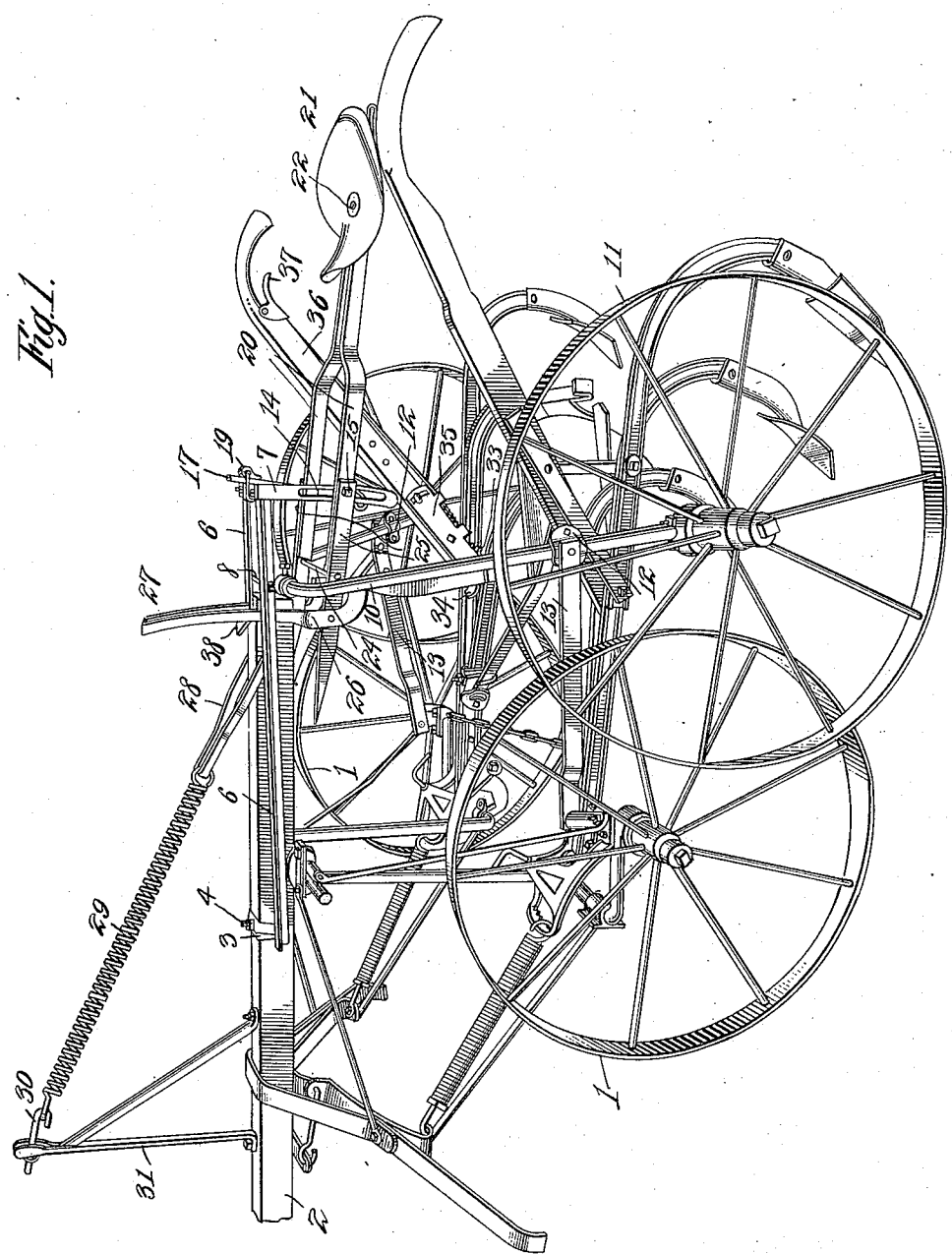

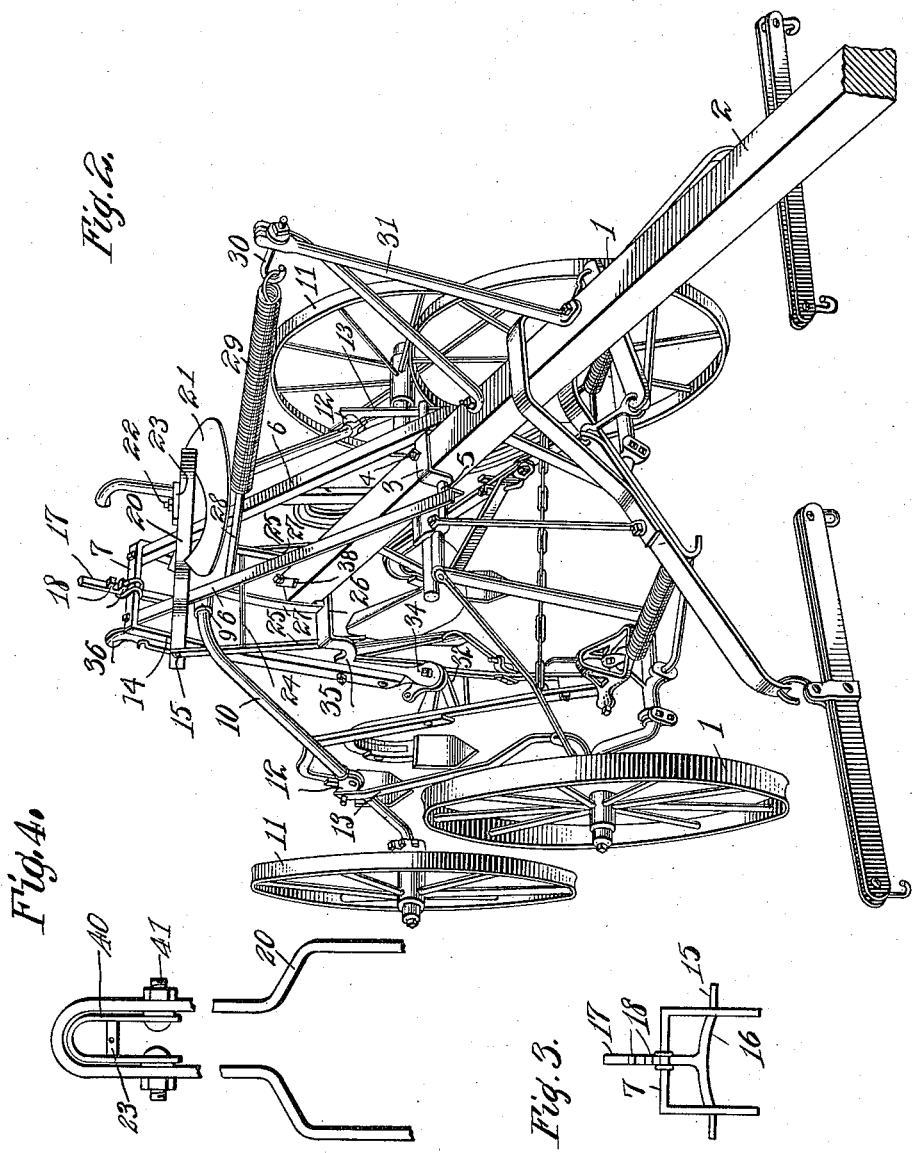

UNITED STATES PATENT OFFICE.

CHARLES N. PULSE, OF LYNCHBURG, OHIO.

RIDING ATTACHMENT FOR CULTIVATORS.

1,279,435.                    Specification of Letters Patent.    Patented Sept. 17, 1918.

Application filed October 2, 1917. Serial No. 194,351.

*To all whom it may concern:*

Be it known that I, CHARLES N. PULSE, a citizen of the United States, residing at Lynchburg, in the county of Highland and State of Ohio, have invented a new and useful Riding Attachment for Cultivators, of which the following is a specification.

The subject of this invention is a riding attachment for cultivators, and the objects of the invention are, first, to provide a seat which may be attached to the usual cultivator, second, to provide means for turning the seat out of the way when not in use, third, to provide means for turning a handle to one side to permit free access to the seat, fourth, to provide a simple and efficient attachment.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

One practical embodiment of the invention is shown in the accompanying drawings, wherein:

Figure 1 is a perspective view of a cultivator equipped with the riding attachment which is shown in position for use;

Fig. 2 is a perspective view of a cultivator showing the seat in raised position;

Fig. 3 is a detail view in elevation of the seat adjusting means.

Fig. 4 is a plan view of a fragment of the seat support.

Referring to the drawings by numerals of reference:

A usual form of cultivator is shown which is supported on wheels 1 and provided with a pole or tongue 2.

A yoke 3 straddles the pole 2, to which it is secured by a bolt 4 or otherwise. Trunnion-like projections 5 extend from the arms of the yoke 3 and they are tapped to receive screw bolts which serve to pivotally secure angle bars 6 to the yoke.

The angle bars 6 normally slope rearwardly and upwardly from the yoke 3 and the rear ends of the bars 6 are straddled by a yoke 7 the cross head of which is secured to the angle bars by bolts or otherwise. A rod or bolt 8 also serves to connect the bars 6 at a median point, the rod passing through the vertically disposed flanges of the angle bars and the laterally projecting ends of the rod 8 support journaling blocks 9 which depend from the angle bars 6.

A bent shaft 10 is journaled in the blocks 9 from which it slopes downwardly and laterally and merges, at each end, into horizontally disposed portions forming axles upon which wheels 11 are mounted. A bracket 12 is clamped to a median point of each downwardly sloping portion of the shaft 10, and to each bracket is pivotally secured one end of a tie bar 13 the other end of which has pivotal engagement with a suitable portion of the frame of the cultivator.

The depending arms of the yoke 7 are longitudinally slotted as indicated at 14, Fig. 1, and through these slots project the reduced ends 15 of a bar 16 which slides between the depending arms of the yoke 7 and from which rises a handle 17. The handle 17 is formed with notches 18 along one edge to receive the edge of the cross head of the yoke 7 for the purpose of adjusting the bar 16 within the yoke. The handle may be held in position when adjusted by any suitable means, such as the cam lever 19.

The reduced ends 15 pass through apertures formed, at median points, in the arms 20 of a seat-support, and pivotally secure the seat-support to the yoke 7. The arms 20 converge at one point toward the head of the seat-support to provide a reduced spacing between the arms. A U bar 40 is adjustably secured within this reduced portion of the yoke 20 by means of bolts 41. A seat 21 is adjustably mounted on this U bar 40 and is secured in position, when adjusted, by means of a bolt 22 which passes between the arms and engages a cross piece 23, which cross piece contacts the other face of the U bar.

The free ends of the arms 20 are cut back at their upper edges to form recesses for the reception of a rod 24 which extends between the bars 25. Each bar 25 has one end pivotally mounted on a reduced end 15, and the bars 25 lie without the arms 20 of the seat-support. The free ends of the bars 25 project through a yoke 26 which depends from and is secured to the rear end of the pole 2 by a bolt or otherwise. Bosses or projections, not shown, may be formed on the opposed faces of the arms of this yoke 26 for the purpose of limiting the movement of the bars 25.

Rising from the yoke 26, and extending above the rear end of the tongue 2, which it embraces, is a frame 27. This frame acts as a guide and stop and limits the forward movement of the parts by contacting the shaft 10 or any other suitable part of the attachment.

A bail-like member 28 is pivotally secured to a median point on the angle bars 6, and this member is secured to one end of an expansion spring 29, the other end of which spring is secured by a screw-hook 30 to a brace 31 which rises from the tongue 2 to which it is secured.

That access to the seat may more readily be had and that the right hand handle of the cultivator may be adjusted to the convenience of the operator, an adjustable mounting is provided.

A plate 32, herein shown as attached to the cultivator standards, is provided with a segmental rack 33. Seated upon and pivotally secured to this plate is a plate 34 which merges into an upwardly sloping portion 35 adapted to be secured to the side of the handle 36. The usual lever 37 is secured to the handle 36 and serves to operate the ordinary spring latch to selectively enter the notches of the rack 33 and adjust the handle.

In practice the device is operated as follows:

The seat, under the tension of the spring 29, is normally held in the elevated position shown in Fig. 2 and, when in this position, the cultivator is used in the usual manner as though the attachment were not present.

When the operator desires to use the cultivator as a riding cultivator, he swings the seat rearwardly causing the parts to assume the positions shown in Fig. 1. The parts may be locked in this position, if desired, by a plate 38 which is pivotally mounted on the rear end of the tongue.

The position of the seat, as heretofore explained, may be adjusted by means of the handle 17.

Having thus described the invention, what is claimed as new and sought by Letters Patent, is:

1. A riding attachment for cultivators, comprising, in combination with a wheel supported cultivator including a tongue, bars pivotally secured to the tongue, a seat pivotally secured to the bars, and means for normally holding the bars and seat in elevated position.

2. A riding attachment for cultivators, comprising, in combination with a wheel supported cultivator including a tongue, bars pivotally secured to the tongue, a yoke straddling the bars, a seat support pivotally secured to the yoke, and means for normally holding the bars and seat support in elevated position.

3. A riding attachment for cultivators, comprising, in combination with a wheel supported frame including a tongue, bars pivotally secured to the tongue, a yoke straddling the bars, a seat support adjustably pivoted to the yoke, a seat on the support, and means for automatically raising the bars and seat to elevated position.

4. A riding attachment for cultivators, comprising, in combination with a wheel supported cultivator including a tongue, bars pivotally secured to the tongue, a yoke straddling the bars, a seat support pivoted to the yoke, a seat adjustable on the support, and means for automatically lifting the bars and seat to elevated position.

5. A riding attachment for cultivators, comprising, in combination with a wheel supported cultivator including a tongue, bars pivotally secured to the tongue, a seat support pivotally secured to the bars, a seat on the support, means for limiting the downward movement of the seat support, and means for automatically raising the bars and seat to elevated position.

6. A riding attachment for cultivators, comprising, in combination with a wheel supported cultivator including a tongue, bars pivoted to the tongue, a seat support pivotally secured to the bars, a seat on the support, means for limiting the downward movement of the seat support, means for locking the bar in lowered position, and means for automatically raising the bars and seat to elevated position.

7. A riding attachment for cultivators, comprising, in combination with a wheel supported cultivator including a tongue, bars pivoted to the tongue, a seat support pivotally secured to the bars, a seat on the support, means for limiting the downward movement of the seat, means for automatically raising the bars and seat to elevated position, and a guide frame and support embracing and rising from the tongue.

8. A riding attachment for cultivators, comprising, in combination with a wheel supported cultivator including a tongue, bars pivoted to the tongue, a seat support pivotally secured to the bars, a seat on the support, a shaft secured to the bars, wheels turning on the shaft, and means for raising the bars, seat, and wheels to elevated position.

9. A riding attachment for cultivators, comprising in combination with a wheel supported cultivator, including a tongue, bars pivotally secured to the tongue, and a seat support connected to the bars whereby elevating the bars will fold the seat over above the tongue.

10. A riding attachment for cultivators, comprising in combination with a wheel supported frame including a tongue, bars pivotally secured to the tongue, a yoke straddling the bars, a seat support adjustably secured to the yoke, and a seat on the support.

In testimony that I claim the foregoing as my own, I have hereto affixed my signature in the presence of two witnesses.

CHARLES N. PULSE.

Witnesses:
L. L. FARIS,
A. GARNER.

Copies of this patent may be obtained for five cents each, by addressing the "Commissioner of Patents, Washington, D. C."